(12) United States Patent
Landi (10) Patent No.: US 9,751,141 B2
(45) Date of Patent: Sep. 5, 2017

(54) METHOD, TOOL AND DEVICE FOR PROFILING A FINISHING TOOL

(71) Applicant: SAMP S.p.A. CON UNICO SOCIO, Bentivoglio (IT)

(72) Inventor: Enrico Landi, Bentivoglio (IT)

(73) Assignee: SAMP S.P.A. CON UNICO SOCIO, Via Saliceto, Bentivoglio (IT)

( * ) Notice: Subject to any disclaimer, the term of this patent is extended or adjusted under 35 U.S.C. 154(b) by 61 days.

(21) Appl. No.: 14/905,947

(22) PCT Filed: Jul. 18, 2014

(86) PCT No.: PCT/IB2014/063228
§ 371 (c)(1),
(2) Date: Jan. 18, 2016

(87) PCT Pub. No.: WO2015/008264
PCT Pub. Date: Jan. 22, 2015

(65) Prior Publication Data
US 2016/0158862 A1 Jun. 9, 2016

(30) Foreign Application Priority Data
Jul. 19, 2013 (IT) .............................. BO2013A0381

(51) Int. Cl.
*B24B 53/07* (2006.01)
*B23F 23/12* (2006.01)
*B24B 53/075* (2006.01)

(52) U.S. Cl.
CPC ........ *B23F 23/1225* (2013.01); *B24B 53/075* (2013.01)

(58) Field of Classification Search
CPC .................... B23F 23/1225; B24B 53/075
(Continued)

(56) References Cited

U.S. PATENT DOCUMENTS 4,993,194 A * 2/1991 Cadisch ................ B24B 53/075
451/253
5,954,568 A * 9/1999 Wirz ..................... B24B 53/075
125/11.01
(Continued)

FOREIGN PATENT DOCUMENTS

DE 199 10 746 9/2000
DE 10 2006 061759 A1 8/2007
(Continued)

OTHER PUBLICATIONS

International Search Report, PCT/IB/2014/063228, Mar. 18, 2015.

*Primary Examiner* — George Nguyen
(74) *Attorney, Agent, or Firm* — Matthew A. Pequignot; Pequignot + Myers LLC (57) ABSTRACT

Method for profiling a finishing tool, in particular a grinding worm, having a first and a second finishing flank; the method providing the steps of: arranging a cutting portion of a profiling tool in contact with the first flank of the thread; causing the cutting portion to slide in contact with the first flank of the thread so as to profile it; removing the cutting portion from the thread; automatically rotating the profiling tool so as to arrange the cutting portion in contact with a second flank of the thread; and causing the cutting portion to slide in contact with the second flank of the thread so as to profile it.

12 Claims, 5 Drawing Sheets

(58) Field of Classification Search
USPC .................................................. 451/57, 443
See application file for complete search history.

(56) References Cited

U.S. PATENT DOCUMENTS

| | | | | |
|---|---|---|---|---|
| 6,077,150 | A * | 6/2000 | Jankowski | B24B 53/12 451/147 |
| 6,234,880 | B1 * | 5/2001 | Scacchi | B23F 23/1225 451/443 |
| 6,491,568 | B1 * | 12/2002 | Jankowski | B24B 53/075 451/253 |
| 8,147,296 | B2 * | 4/2012 | Lopez | B24B 53/085 125/11.03 |
| 8,932,105 | B2 * | 1/2015 | Heidelmann | B23F 1/02 451/47 |
| 2007/0202774 | A1 * | 8/2007 | Yanase | B23F 23/1225 451/5 |
| 2010/0304642 | A1 * | 12/2010 | Mundt | B23F 1/02 451/5 |
| 2011/0159787 | A1 | 6/2011 | Kobialka | |
| 2011/0268522 | A1 * | 11/2011 | Ochi | B23F 5/04 409/10 |
| 2014/0308877 | A1 * | 10/2014 | Weppelmann | B23F 17/00 451/5 |

FOREIGN PATENT DOCUMENTS

| | | |
|---|---|---|
| DE | 10 2011 120449 A1 | 6/2013 |
| EP | 2 093 020 A1 | 8/2009 |

* cited by examiner

METHOD, TOOL AND DEVICE FOR PROFILING A FINISHING TOOL

RELATED APPLICATION DATA

This application is the national stage entry of International Appl. No. PCT/IB2014/063228, filed Jul. 18, 2014, which claims priority to Italian Patent Application No. BO2013A000381, filed Jul. 19, 2013. All claims of priority to such patent application(s) are hereby made, and all such application(s) are hereby incorporated in their entirety by reference.

TECHNICAL FIELD

The present patent application relates to a method, a tool and a device for profiling a finishing tool. In particular, the present invention relates to a method, a tool and a device for the profiling of a grinding worm.

BACKGROUND ART

It is known, for example from DE19910746, to revive the profile of a grinding worm by means of profiling disc tools, which have active cutting portions that are caused to slide in contact with the thread of the grinding worm itself. Different types of profiling tools which differ, one with respect to another, in the shape and dimensions of the respective cutting profiles and which are suited for profiling the grinding worm through a linear or localized contact i.e. in a small and circumscribed area are also known. The profiling operation with linear contact is relatively fast, however, it has the limitation of obtaining a profile along the flank of the thread equal to the profile of the disc profiling tool. While, with the profiling operation with localized contact variable profiles on the axial section of the thread can be obtained; however, the finishing operation with localized contact has the disadvantage of being relatively slow as the profiling tool must perform a large series of repeated passages in order to treat the entire profile of the grinding worm. Furthermore, the profiling operation with localized contact requires the machining of rectilinear sections with radiated portions of a tool consequently obtaining imperfect local machining.

It is well known to replace the profiling tool to obtain different profiling operations, for instance to obtain linear or pin-point profiling.

It is also known to use, selectively and depending on the specific purpose, profiling tools with differing cutting characteristics (model, size, distribution of the abrasive material, kind of binder, etc. . . . ). Profiling tools with different cutting characteristics are often used to shorten the profiling time or for profiling grinding worms having a greater hardness and that cause relatively fast wear on the profiling tool.

However, the costs of the profiling tool are high and replacement times of the same are relatively long.

DISCLOSURE OF INVENTION

Purpose of the present invention is to provide a method, a tool and a device for profiling finishing tools suitable for overcoming the drawbacks described above.

Furthermore, the purpose of the present invention is to provide a method, a profiling tool and a device suited to perform a plurality of different profiling operations (e.g.: roughing-out operation, finishing, profiling with linear contact or with localized contact) by the same profiling tool and suited to reduce the grinding worm profiling time.

In particular, an object of the present invention is to provide a method, a profiling tool and a device which allow to profile also grinding worms having greater hardness by using the same profiling tool and ensuring a longer service life than known types of profiling tools.

According to the present invention a method, a tool and a device as claimed in the appended Claims are provided.

BRIEF DESCRIPTION OF THE DRAWINGS

The invention will now be described with reference to the accompanying drawings, which illustrate a non-limiting embodiment, wherein.

BEST MODE FOR CARRYING OUT THE INVENTION

In Figures, 1 refers as a whole to a device for profiling a finishing tool 2. In the Figures shown, the finishing tool is a grinding worm 2 which is installed on a vertical axes grinding machine (of a known type and not illustrated), which is movable in the space along three axes and is rotatable around an axis A. The grinding worm 2 comprises a thread 3, which is delimited axially by a flank 4 and by a flank 5 and has a plurality of coils S. Two adjacent coils S delimiting a compartment 6 of the thread 3.

Figure 1:
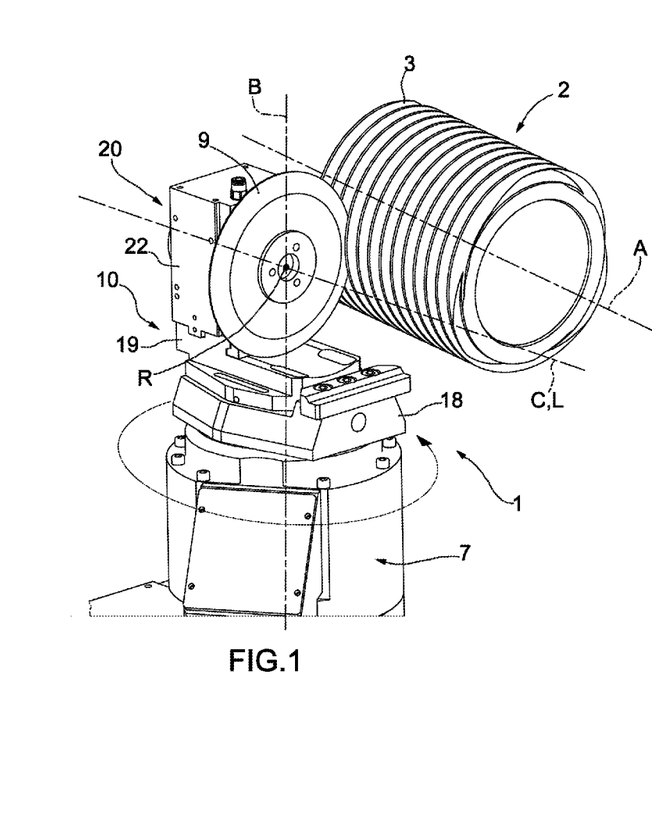
FIG. 1 is a perspective view, with some parts removed for the sake of clarity, of a device according to the present invention.
Figure 2:
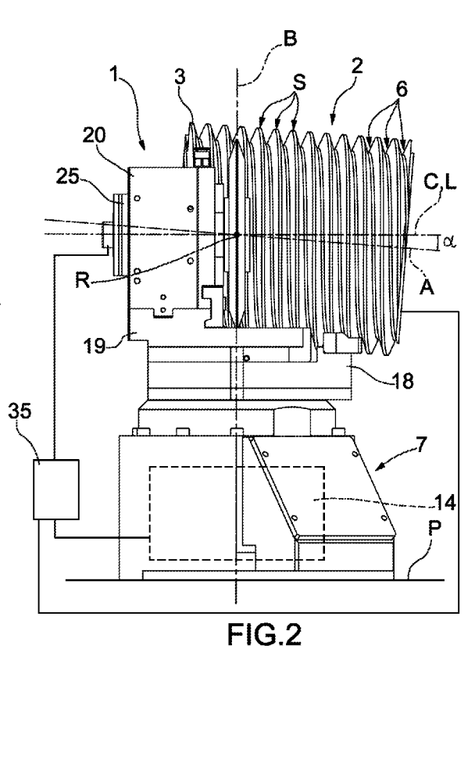
FIG. 2 is a side view of the device of FIG. 1.

As illustrated in FIGS. 1 and 2, the device 1 comprises a base 7 suited to be arranged on a horizontal abutment plane P, a spindle 8 (shown in FIG. 7), suitable for supporting and rotating a profiling tool 9 around an axis C and around a support 10, which is sandwiched between the base 7 and the spindle 8. The support 10 is partially inserted inside the base 7 and is mounted rotatable around an axis B perpendicular to the plane P, as will be explained better below. The axis C is transverse to the axis B. The axis C is parallel to the plane P.

In the following the terms upper and lower, vertical and horizontal are used with reference to the support plane P.

Figure 9:
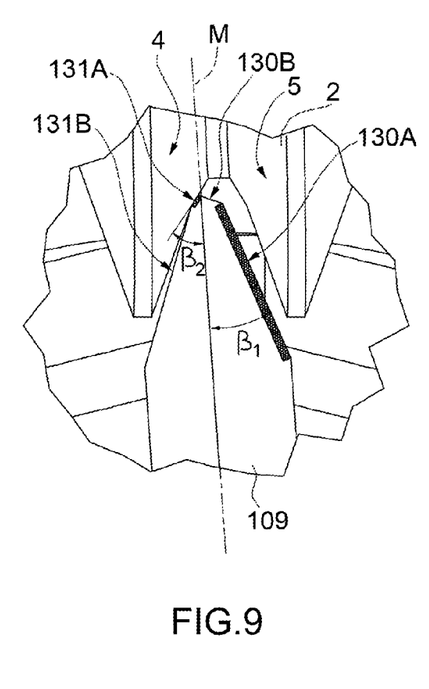
FIG. 9 is similar to FIG. 8 and illustrates the alternative profiling tool in another operating configuration; and, FIG. 10 is similar to FIG. 9 and illustrates the alternative profiling tool in a further operating configuration.

As illustrated in FIG. 9, the base 7 has an internal cavity 11 and is delimited vertically by an upper end 12 and by a lower end 13 suited to be arranged in contact with the plane P. The device 1 also comprises an actuating system 14 which is installed inside the cavity 11 of the base 7 and is connected in a known manner to the support 10 and is suitable for rotating the support 10 itself around the axis B. Preferably, the support 10 is suitable for performing a rotation of at least 210° around the axis B.

Figure 7:
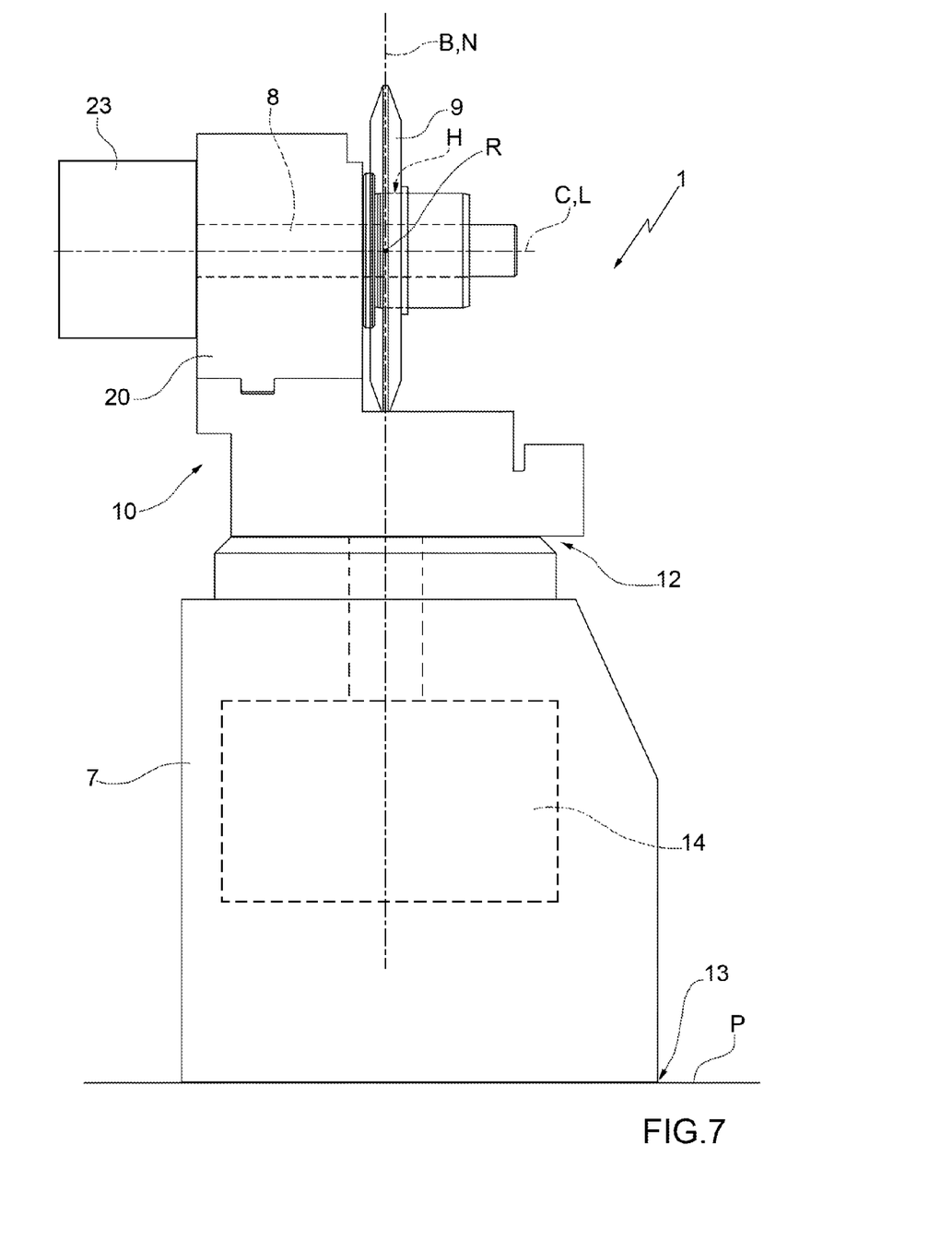
FIG. 7 is a schematic side view, with parts removed for clarity, of the device according to the present invention.

As shown in detail in FIG. 7, the support 10 comprises:
a table 18, which outwardly protrudes from the upper end 12 of the base 7;
a plate 19, which is mounted rotatable around the axis B on the table 18; and,
a support and actuating turret 20 of the spindle 8 attached to the plate 19.

The turret 20 is attached to the plate 19 in a decentralized position with respect to axis B. The radial distance between the turret 20 and axis B is such to allow the alignment of profiling tool 9 with axis B itself, as will be explained in more detail below.

As illustrated in FIG. 7, the turret 20 comprises a motor 23 being connected to spindle 8 in a known manner and illustrated schematically. Motor 23 is suited to rotate spindle 8 around the axis C.

As illustrated in the Figures, the profiling tool 9 has the shape of a disc rotatable around a rotation axis L. The profiling tool 9 has two additional axes M and N; the axes L, M, N are perpendicular to one another and correspondingly intersect one another at a rotation center R.

The profiling tool 9 has a double cone shape. In particular, profiling tool 9 has, in axial section, two cutting portions 30 and 31 which are divided from one another by the axis M perpendicular to the axis L. As illustrated in FIGS. 3 to 6, cutting portion 30 and cutting portion 31 are angled both to one another and with respect to the axis M.

Substantially, the profiling tool 9 has a biconical profile wherein adjacent cutting portions provide cutting properties differing from one another.

For instance, cutting portion 30 and cutting portion 31 are made of materials differing from one another, in particular being made of abrasive materials presenting different grits.

In particular, cutting portion 30 is suited to perform a roughing-out operation (of a known type and illustrated schematically). Whereas, cutting portion 31 is suited to perform a finishing operation (of a known type and illustrated schematically). In FIGS. 3 to 6, cutting portion 30 is illustrated as a portion of coarse grit material and cutting portion 31 is illustrated as a portion of fine grit material.

Figure 8:
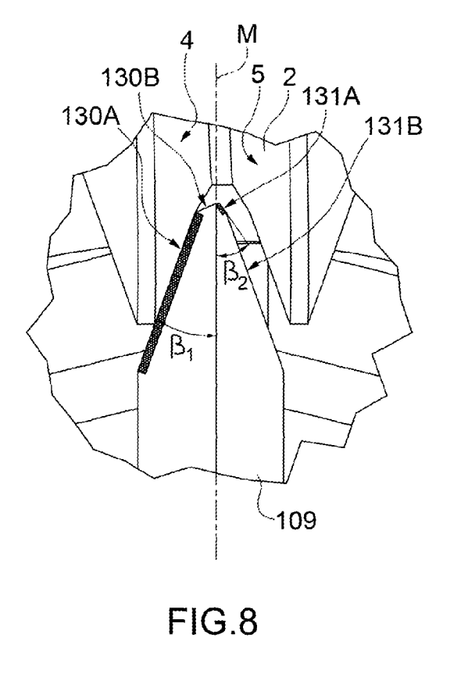
FIG. 8 illustrates, in enlarged scale, a detail of an alternative profiling tool according to the present invention in an operative configuration.

According to the alternative embodiment illustrated in FIGS. 8 and 9, the profiling tool 109 has, in axial section and in correspondence of the free end thereof, an asymmetrical profile with respect to the axis M and delineated by dashed lines.

The profiling tool 109 has in axial section and in correspondence of its free end thereof, a cutting portion 130A, a cutting portion 131A and a connecting portion 130B sandwiched between the cutting portion 130A and the cutting portion 131A. The profiling tool also has a support portion 131B adjacent to the cutting portion 131A.

The cutting portion 130A is suited to provide a relatively extended linear contact between the profiling tool 109 and the thread 3.

Cutting portion 131A is suited to perform a smaller linear contact with thread 3 as compared with that of cutting portion 130A. Cutting portion 131A is suited to perform a localized contact along the thread 3.

Cutting portion 130A is diamond. Cutting portion 131A is diamond.

The cutting portions 130B and 131B substantially define the retaining and positioning supports for the cutting portions 130A and 131A. The cutting portions 130A and 130B are inclined to one another. Similarly, the cutting portions 131A and 131B are angled to one another.

As clearly visible in FIGS. 8 and 9, the cutting portions 130B and 131A are inclined both to one another and with respect to the axis M. Preferably, the intersection point between the portion 130B and the cutting portion 131A falls on the axis M.

The angle $\beta_1$ between the cutting profile 130A and the axis M is different from the angle $\beta_2$ comprised between the cutting profile 131A and the axis M itself. The projection of the cutting portion 130A on the axis M is greater than the projection of the cutting projection 131A on the axis M.

The cutting portion 130A is suited to perform a different profiling operation with respect to cutting portion 131A.

In FIG. 7 a profiling tool 9 mounted on the spindle 8 is shown. The profiling tool 9 is fitted around the spindle 8 so that the axis L coincides with the rotation axis C of the spindle itself.

The spindle 8 is suited to cause the axis N of the profiling tool 9 to coincide with the rotation axis B of the support 10. In other words, the spindle 8 is suited to arrange the rotation center R of the profiling tool 9 on the rotation axis B of the support 10. As illustrated in FIG. 7 the size of the spindle 8 and of the turret 20 is such that it allows the alignment between the rotation center R of the profiling tool 9 and the rotation axis B of the support 10. In particular, the location and the extension along the axis C of the housing H of the profiling tool 9 are also chosen in relation with the structural dimension of the support 10 so that, once the profiling tool 9 is attached to the spindle 8, the axis N coincides with the rotation axis B of the support 10. In this way the axis N of the profiling tool 9 remains aligned with the rotation axis B of the support 10, whatever the angular position of support 10 around axis B.

The device 1 also comprises a control unit 35 (of a known type and illustrated schematically) that automatically adjusts the rotation of the support 10 by means of the actuating system 14 based on certain operating parameters. Preferably, the control unit 35 determines the automatic rotation of the support 10 around the axis B when the profiling tool 9 has finished the profiling of a longitudinal section determined by the grinding worm 2. The control unit 35 is connected to the grinding worm 2, to the spindle 8 and to the actuating system 14 in a known manner and illustrated schematically.

In use, the grinding worm 2 is inclined (FIG. 2) with respect to the axis C of the spindle 8 by an angle α, which is a function of the inclination of the flank 4 or 5 of the thread 3 and of the geometry of the profiling tool 9.

The grinding worm 2 is set in rotation around the axis A, the profiling tool 9 is set in rotation around the axis C.

Figures 3, 3A:
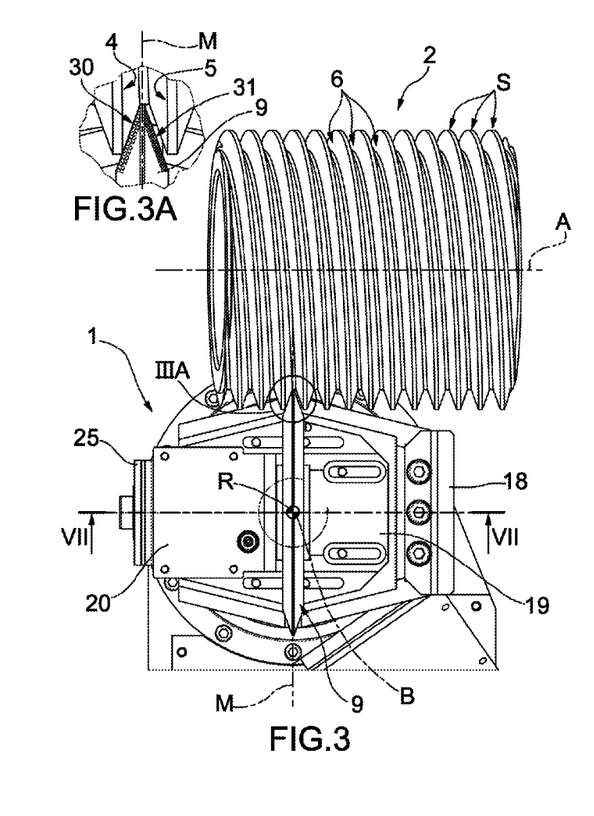
FIGS. 3, 4, 5 and 6 are plan views with some parts removed for clarity of the profiling tool and of the device according to the present invention in respective different operating configurations.
FIGS. 3A, 4A, 5A and 6A are enlargements IIIA, IVA, VA, VIA of FIGS. 3, 4, 5 and, respectively, 6.

The cutting portion 30 of the profiling tool 9 is made to contact, in a known manner, by actuating the grinding worm 2, with a flank 4 of the grinding worm 2 itself (FIGS. 3 and 3A).

The grinding worm 2 is translated in a known manner causing the cutting portion 30 to slide in contact with the flank 4 of the thread 3 along a longitudinal section determined by the grinding worm 2 so as to profile it. By translations of a known type of the grinding worm 2, the cutting portion 30 is caused to slide in contact with the flank 4 for a number of runs sufficient for eliminating the required material.

Therefore, the grinding worm 2 is removed, in a known manner, from the profiling tool 9 so as to remove the cutting portion 30 from the thread 3, and in particular, so as to remove the profiling tool 9 away from the compartment 6 of the thread 3.

Figures 4, 4A:
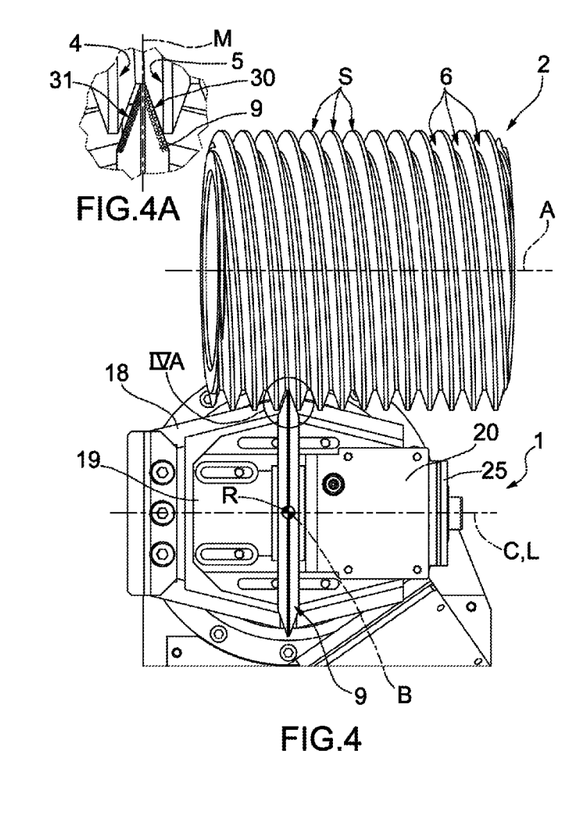

Subsequently, the support 10 is rotated around the axis B by at least 180°. The grinding worm 2 is moved nearer to the profiling tool 9 so as to put the cutting portion 30 in contact with the flank 5 of the thread 3 (FIGS. 4 and 4A).

Finally, the grinding worm 2 is translated, in a known manner, to cause the cutting portion 30 to slide in contact with the flank 5 of the thread 3 for a longitudinal section determined by the grinding worm 2 so as to profile it.

By translations of the grinding worm 2 of a known type, the cutting portion 30 is caused to slide in contact with the flank 5 for a number of runs sufficient for eliminating the necessary material.

Preferably, the cutting portion 30 is suited to perform a roughing-out operation of the thread 3.

Figures 5, 5A:
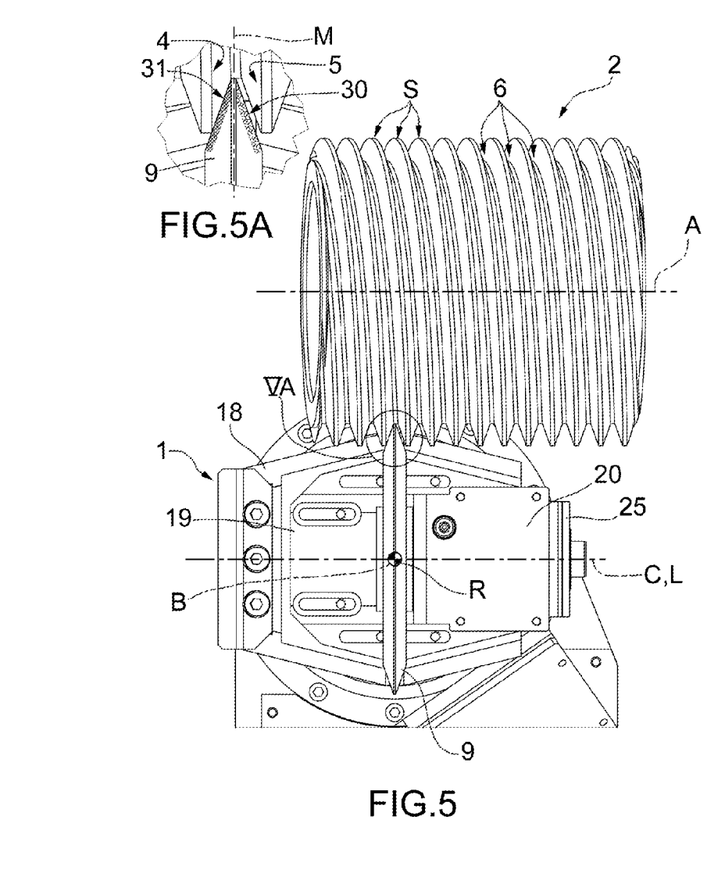

The steps described above are substantially repeated by bringing the cutting portion 31 in contact with flanks 4 and 5 of the thread 3. Therefore, the cutting portion 31 is arranged in contact, by actuating the grinding worm 2 in a known manner, with a flank 4 of the grinding worm 2 itself (FIGS. 5 and 5A).

The grinding worm 2 is translated, in a known manner, to slide the cutting portion 31 in contact with the flank 4 of the thread 3 for a longitudinal section determined by the grinding worm 2 so as to profile it.

By translations of the grinding worm 2 of a known type, the cutting portion 31 is caused to slide in contact with the flank 4 for a number of runs sufficient to eliminate the necessary material.

Therefore, the grinding worm 2 is removed, in a known manner, from the profiling tool 9 so as to remove the cutting portion 31 from the thread 3, and in particular, so as to remove the profiling tool 9 from the compartment 6.

Figures 6, 6A:
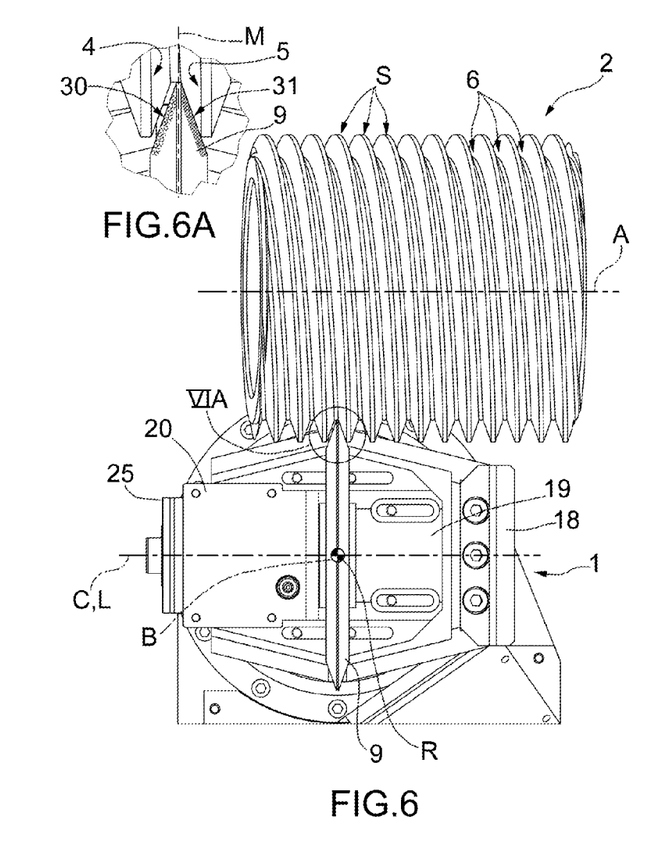

Subsequently, the support 10 is rotated around the axis B by at least 180°. The grinding worm 2 is arranged near to the profiling tool 9 so as to arrange the cutting portion 31 in contact with the flank 5 of the thread 3 (FIGS. 6 and 6A).

Finally, the grinding worm 2 is translated, in a known manner, to slide the cutting portion 31 in contact with the flank 5 of the thread 3 for a longitudinal section determined by the grinding worm 2 so as to profile it.

By translations of the grinding worm 2 of a known type, the cutting portion 31 is caused to slide in contact with the flank 5 for a number of runs sufficient to eliminate the necessary material.

Preferably, the cutting portion 31 provides a finishing of the thread 3.

During the profiling steps the profiling tool 9 is kept fixed in a determined angular position with respect to the axis B.

According to an alternative embodiment not shown, during the profiling steps the support 10 and/or the base 7 are translated (in a known manner not shown) so as to relatively move and position one with respect to the other the spindle 8 and the grinding worm 2.

In the case of using a profiling tool 109 of the type illustrated in FIGS. 8 and 9, the support 10 is rotated to provide a linear contact between the thread 3 and the cutting portion 130A and a localized contact between the thread 3 and the cutting portion 131A. The support 10 to this end can perform rotations around the axis B up to 210°. The profiling steps described for the profiling tool 9 remain unchanged also for the use of the profiling tool 109.

Figure 10:
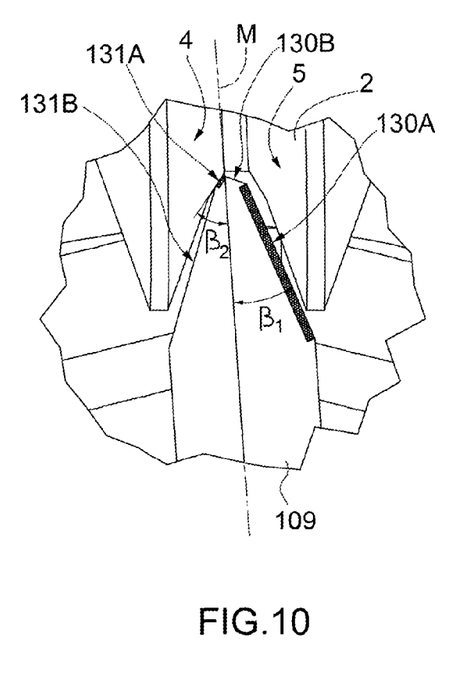

According to what is illustrated in FIGS. 9 and 10, the radial position and the inclination of the cutting portion 131A with respect to the flank 4 can vary from one passage to the next. In this way it is possible to locally modify the profile of the portions of the grinding worm 2 treated with the cutting portion 131A. Therefore, by the cutting portion 131A it is possible to locally modify the profile of the grinding worm 2, as needed. What is mentioned above for the treatment of the flank 4 by the cutting portion 131A of course holds also for the treatment of the flank 5.

During the rotation of the support 10 around the axis B, the rotation center R of the profiling tool 9 or 109 is maintained on the axis B.

From the above it therefore follows that by the use of a single profiling tool 9 or 109 it is possible to carry out different profiling operations, significantly reducing the profiling time and the cost for replacement of profiling tool 9 or 109 itself.

Furthermore, the ability to rotate the support 10 by over 180° allows to automatically obtain different profiling operations with the same tool 109 for example, roughing-out or finishing operations. In particular, by using the two different cutting portions 130A or, respectively, 131A of the profiling tool 109 it is possible to obtain different respective contact areas between the tool 109 and the thread 3.

Profiling tool 109 allows to considerably reduce the profiling time of the grinding worm 2; in fact, thanks to the cutting portion 130A it is also possible to profile with only one passage a large part (up to 90%) of the flank 4 or 5 of the grinding worm 2; while, with the cutting portion 131A it is only possible to profile the part of the grinding worm 2 which should be treated by a localized contact. In this way the profiling tool 109 allows to obtain finished grinding worms 2 with a reduced number of passages and, consequently, the finishing times with respect to the use of a profiling pin-point tool of a known type, through which the entire profile of the grinding worm 2 is treated with a localized contact, are substantially reduced.

Keeping the rotation center R of the profiling tool 9 or 109 aligned with the axis B the profiling activities are easier and faster and the optimization of space also allows the profiling of the entire grinding worm 2.

In addition, keeping the rotation center R of the profiling tool 9 or 109 aligned with the axis B eccentric positions of the cutting profiles 30, 31, 130A or 131A are avoided; therefore, geometric errors of the profile of the thread 3 are avoided and the space requirements for the threading of the grinding worm 2 are reduced.

Furthermore, the profiling tool 9 of the type described above has a longer service life compared to the profiling tools of a known type. In fact the profiling tool 9 has the advantage of being suitable for use for an extended time (hence without the need for frequent replacement of the profiling tool due to wear) also for profiling grinding worms of greater hardness; in particular, thanks to the cutting portion 30 (roughing-out operation) it is possible to eliminate most of the allowance of the grinding worm 2 to be profiled and by the cutting portion 31 (finishing operation) the removal of a final percentage of allowance is obtained, which is decidedly lower than the previous one. In this way, the cutting portion 31 (the more resistant and lasting in time) is used for the removal of most part of the allowance of the grinding worm 2, while the cutting portion 30 is used only for the true finishing and for the removal of lesser allowance. In this way the service life of the profiling tool 9 is clearly extended and the frequency of replacement of the profiling tool 9 is greatly reduced.

Finally, thanks to the method, the tool and the device described above it is possible, by using a single profiling tool 9 or 109, to obtain longitudinal portions of the grinding worm 2 with cutting properties suitable for the roughing-out operation and a successive portion with cutting properties suitable for the finishing operations.

The invention claimed is:

1. A method for profiling a finishing tool (2), in particular a grinding worm, having a first and a second flank (4, 5); the method comprising the steps of:
arranging a cutting portion (30; 31; 130A; 131A) of a profiling tool (9; 109) in contact with the first flank (4);
causing the cutting portion (30; 31; 130A, 131A) to slide in contact with the first flank (4) so as to profile it;
removing the cutting portion (30; 31; 130A, 131A) from the first flank (4);
automatically rotating the profiling tool (9; 109) so as to arrange the cutting portion (30; 31; 130A, 131A) in contact with the second flank (5);
causing the cutting portion (30; 31; 130A, 131A) to slide in contact with the second flank (5) so as to profile it; and,
wherein the profiling tool (9; 109) is a disc rotatable around a first axis (L); wherein the step of automatically rotating the profiling tool (9; 109) provides for the rotation of the profiling tool (9; 109) by at least 180° around a second axis (N) transverse to the first axis (L).

2. Method, according to claim 1, wherein the finishing tool (2) is a grinding worm comprising a thread (3) with a first and a second flank (4, 5) to be profiled; wherein the profiling tool (9; 109) has a first cutting portion (30; 130A), which is suited to perform a first profiling operation and a second cutting portion (31; 131A), which is suited to perform a second profiling operation; the method comprising the steps of:
arranging the first cutting portion (30; 130A) in contact with the first flank (4) of the thread (3);
causing the first cutting portion (30; 130A) to slide in contact with the first flank (4) of the thread (3) so as to perform the first profiling operation;
removing the first cutting portion (30; 130A) from the first flank (4) of the thread (3);
automatically rotating the profiling tool (9; 109) so as to arrange the first cutting portion (30; 130A) in contact with the second flank (5) of the thread (3);
causing the first cutting portion (30; 130A) of the profiling tool (9; 109) to slide in contact with the second flank (5) of the thread (3) so as to perform the first profiling operation;
arranging the second cutting portion (31; 131A) of the profiling disc in contact with the first flank (4) of the thread (3);
causing the second cutting portion (31; 131A) to slide in contact with the first flank (4) of the thread (3) to perform the second profiling operation;
removing the second cutting portion (31; 131A) from the second flank (5) of the thread (3);
automatically rotating the profiling tool (9; 109) so as to arrange the second cutting portion (31; 131A) in contact with the second flank (5) of the thread (3); and,
causing the second cutting portion (31; 131A) of the profiling tool (9; 109) to slide in contact with the second flank (5) of the thread (3) to perform the second profiling operation.

3. Method, according to claim 2, wherein the first profiling operation is a roughing-out operation and the second profiling operation is a finishing operation.

4. Method, according to claim 2, wherein the first profiling operation is with linear contact and the second profiling operation is with localized contact i.e. a contact with a small and circumscribed area.

5. Method, according to claim 1, wherein the angular position of the profiling tool (9; 109) with respect to a second axis that is transverse to the first axis (L), is fixed during each step in which a cutting portion (30; 31; 130A, 131A) is caused to slide into contact with a flank (4; 5) of the thread (3).

6. A profiling tool (9; 109) for performing the method of claim 1 having the shape of a disc; wherein the profiling tool (9; 109) has a first rotation axis (L), a first cutting portion (30; 130A) and a second cutting portion (31; 131A) which are suited to profile the finishing tool (2); in an axial section, the first and the second cutting portion (30, 31; 130A, 131A) are divided from one another by a second axis (M) that is perpendicular to the rotation axis (L) of the profiling tool (9; 109); the profiling tool (9; 109) having a rotation center (R) defined by the intersection of said first and second axis (L, M); wherein the first cutting portion (30; 130A) and the second cutting portion (31; 131A) have cutting properties different from one another.

7. Tool, according to claim 6, wherein the first cutting portion (30; 130A) and the second cutting portion (31; 131A) are asymmetric with respect to the second axis (M).

8. Tool, according to claim 6, wherein the first cutting portion (30) and the second cutting portion (31) are made of abrasive material; the first cutting portion (30) is suited to perform roughing-out operations; the second cutting portion is suited to perform finishing operations (31).

9. Tool, according to claim 6, wherein the first cutting portion (130A) and the second cutting portion (131A) have different extensions from one another; wherein the extension of the first cutting portion (130A) is greater than the extension of the second cutting portion (131A) so that the first cutting portion (30) is suited to perform profiling operations with linear contact while the second cutting portion (131A) is suited to perform profiling operations with localized contact i.e. contact with a small and circumscribed area.

10. A device for profiling a finishing tool (2), in particular a grinding worm, according to the method of claim 1 by means of a profiling tool (9; 109), which is a disc and has a first rotation axis (L) and a second axis (B) transverse to said first axis (L); wherein the profiling device (1) comprises a support (10), which is mounted rotatable around a third axis (B), and a tool carrier spindle (8), which is installed on the support (10) and is mounted rotatable around a fourth axis (C); wherein, in use, the profiling tool (9; 109) is fitted around said spindle (8) so that said first axis (L) coincides with said fourth axis (C) and said second axis (N) coincides with said third axis (B); wherein the third axis (B) and the fourth axis (C) are transverse, in particular perpendicular, to one another; and, wherein the support (10) performs a rotation greater than 180° around the third axis (B).

11. Device, according to claim 10, wherein the profiling tool (9; 109) has a rotation center (R); the support (10) and the spindle (8) being suited to keep the rotation center (R) of the profiling tool (9; 109) on the third axis (B), whatever the angular position of the support (10) itself around said third axis (B).

12. Device, according to claim 10, wherein the spindle (8) has a housing (H) for said profiling tool (9; 109), wherein the position and the extension of said housing (H) are a function of the structural dimension of the support (10) and of the position of said third axis (B).

* * * * *